United States Patent
Cress (10) Patent No.: US 10,547,407 B2
(45) Date of Patent: Jan. 28, 2020

(54) ENHANCED PASSIVE OPTICAL NETWORK

(71) Applicant: ADTRAN, Inc., Huntsville, AL (US)

(72) Inventor: Jared Cress, Decatur, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 16/159,285

(22) Filed: Oct. 12, 2018

(65) Prior Publication Data

US 2019/0123846 A1    Apr. 25, 2019

Related U.S. Application Data

(60) Provisional application No. 62/574,338, filed on Oct. 19, 2017.

(51) Int. Cl.
| | |
|---|---|
| *H04J 14/08* | (2006.01) |
| *H04J 14/02* | (2006.01) |
| *H04Q 11/00* | (2006.01) |
| *H04B 10/272* | (2013.01) |

(52) U.S. Cl.
CPC ........ *H04J 14/0249* (2013.01); *H04B 10/272* (2013.01); *H04J 14/0235* (2013.01);
(Continued)

(58) Field of Classification Search
CPC .... H04J 14/0249; H04J 14/0235; H04J 14/08; H04J 14/0227; H04J 3/22; H04J 14/0246;
(Continued)

(56) References Cited

U.S. PATENT DOCUMENTS

| | | | |
|---|---|---|---|
| 8,027,461 B1* | 9/2011 | Cress | H04M 11/062 |
| | | | 379/390.02 |
| 8,254,409 B2* | 8/2012 | Breton | H04L 12/2852 |
| | | | 370/222 |

(Continued)

FOREIGN PATENT DOCUMENTS

| | | |
|---|---|---|
| EP | 0840963 | 5/1998 |
| WO | WO 2014/183504 | 11/2014 |
| WO | WO 2016/190302 | 12/2016 |

OTHER PUBLICATIONS

PCT International Search Report and Written Opinion in International Appln. No. PCT/US2018/055977, dated Jan. 24, 2019, 16 pages.

*Primary Examiner* — Hibret A Woldekidan
(74) *Attorney, Agent, or Firm* — Fish & Richardson P.C.

(57) ABSTRACT

Methods, systems, and apparatus, including computer programs encoded on a computer storage medium, for reducing jitter and latency in a PON. In one aspect, an optical network unit includes a downstream optical receiver configured to receive downstream traffic over a first wavelength; a first upstream optical transmitter having a first data rate; a second upstream optical transmitter having a second data rate that is higher than the first data rate; and a controller configured to direct upstream traffic to one of the first upstream optical transmitter or the second upstream optical transmitter depending on a traffic type of the traffic. Traffic having a control plane traffic type is directed to the first upstream optical transmitter and traffic having a data plane traffic type is directed to the second upstream optical transmitter.

18 Claims, 5 Drawing Sheets

(52) U.S. Cl.
CPC .......... *H04J 14/08* (2013.01); *H04Q 11/0067* (2013.01); *H04Q 2011/0064* (2013.01)

(58) Field of Classification Search
CPC ........ H04J 14/025; H04J 3/1694; H04J 14/02; H04J 3/0682; H04J 3/14; H04B 10/2507; H04B 10/272; H04B 10/40; H04B 10/07955; H04Q 11/0067; H04Q 2011/0086; H04Q 11/0071; H04Q 2011/0064; Y02D 50/40
USPC .......................... 398/47, 75, 79, 98, 100, 57
See application file for complete search history.

(56) References Cited

U.S. PATENT DOCUMENTS

| | | | | |
|---|---|---|---|---|
| 8,391,182 | B2 * | 3/2013 | Breton | H04L 12/2852 |
| | | | | 370/222 |
| 9,025,949 | B2 * | 5/2015 | Khotimsky | H04B 10/032 |
| | | | | 398/1 |
| 9,735,864 | B2 * | 8/2017 | Cohn | H04B 10/032 |
| 9,780,908 | B2 * | 10/2017 | Vetter | H04J 14/0282 |
| 9,838,112 | B2 * | 12/2017 | Grobe | H04B 10/071 |
| 2007/0230957 | A1 * | 10/2007 | Ozaki | H04J 14/0226 |
| | | | | 398/71 |
| 2011/0103792 | A1 * | 5/2011 | Kimura | H04B 10/032 |
| | | | | 398/2 |
| 2015/0093108 | A1 * | 4/2015 | Hirth | H04J 14/0223 |
| | | | | 398/34 |
| 2016/0218801 | A1 * | 7/2016 | Chung | H04B 10/07953 |
| 2018/0199334 | A1 * | 7/2018 | Ying | H04W 72/0413 |

* cited by examiner

*(Prior Art)*

(Prior Art)

ENHANCED PASSIVE OPTICAL NETWORK

CROSS-REFERENCE TO RELATED APPLICATIONS

This application claims the benefit under 35 U.S.C. § 119(e) of U.S. Patent Application No. 62/574,338, entitled "Cost Effective TDM-PON Extension for Fronthaul," filed Oct. 19, 2017, which is incorporated herein by reference in its entirety.

BACKGROUND

Historically, Passive Optical Networks (PON) have utilized burst-mode operation, or time division multiple access, to handle upstream traffic. The optical line terminal (OLT) assigns timeslots to each optical network unit (ONU) in a master-slave configuration. New ONUs are typically discovered and ranged periodically during what is known as a "quiet window", where no timeslots are assigned to known ONUs and any ONU wishing to join the PON advertises itself.

SUMMARY

This specification relates to a passive optical network (PON) and techniques for reducing latency and jitter in PONs.

In general, one innovative aspect of the subject matter described in this specification can be embodied in an optical network unit that includes a downstream optical receiver configured to receive downstream traffic over a first wavelength; a first upstream optical transmitter having a first data rate; a second upstream optical transmitter having a second data rate that is higher than the first data rate; and a controller configured to direct upstream traffic to one of the first upstream optical transmitter or the second upstream optical transmitter depending on a traffic type of the traffic. Traffic having a control plane traffic type is directed to the first upstream optical transmitter and traffic having a data plane traffic type is directed to the second upstream optical transmitter. Other embodiments of this aspect include corresponding systems, apparatus, and computer programs, configured to perform the actions of the methods, encoded on computer storage devices.

These and other embodiments can each optionally include one or more of the following features. The controller can be configured to direct the control plane traffic to the first upstream optical transmitter during discovery and ranging of the ONU and direct the upstream data plane traffic to the second upstream optical transmitter after discovery and ranging of the ONU has completed.

The controller can be further configured to perform operations including receiving downstream control plane traffic over the first wavelength; and determining, based on a message in the downstream control plane traffic, that upstream control plane traffic is to be transmitted over the second wavelength rather than the first wavelength.

The controller can be further configured to perform operations including determining, based on timing information included in the downstream control plane traffic, an upstream transmission time interval that has been allocated to the optical network unit for transmission of upstream control plane traffic over the third wavelength; and transmitting, using the first upstream optical transmitter, upstream control plane traffic over the third wavelength when the upstream transmission time interval that has been allocated to the optical network unit arrives.

The controller can be configured to perform operations including transmitting, using the first upstream optical transmitter, an upstream activation message over the third wavelength; receiving, using the downstream optical receiver, downstream control plane traffic over the first wavelength; completing activation of the optical network unit; and transmitting, using the second upstream optical transmitter, upstream data plane traffic over the second wavelength after activation has completed.

The controller can be configured to perform operations including determining, after a pre-specified amount of time, that an acknowledgment of the upstream activation message transmitted over the third wavelength has not been received over the first wavelength; and re-transmitting the upstream activation message over the third wavelength in response to the determination that the acknowledgement has not been received over the first wavelength.

The first upstream optical transmitter can have a fixed optical wavelength at the third wavelength; and the second upstream optical transmitter can have a fixed optical wavelength at the second wavelength.

Transmission of the upstream control plane traffic over a different wavelength than the upstream data plane traffic eliminates the need for a quiet period during which upstream data plane traffic of known ONUs is halted for an activation process that discovers and ranges unknown ONUs. Elimination of the quiet period reduces latency and jitter for traffic flowing across a TDM-based PON in which the optical network unit is deployed. Transmission of the upstream control plane traffic over a different wavelength than the upstream data plane traffic in a PON provides an upstream latency and jitter profile that satisfies mobile Fronthaul application requirements.

In general, another aspect of the subject matter described in this specification can be embodied in systems that include an OLT; and one or more ONUs that are communicatively coupled to the OLT by a PON. At least one of the ONUs includes a downstream optical receiver; a first upstream optical transmitter having a first data rate; and a second upstream optical transmitter having a second data rate that is higher than the first data rate. The optical receiver is configured to receive downstream data plane traffic over a first wavelength. The second upstream optical transmitter is configured to transmit upstream data plane traffic over a second wavelength. The first upstream optical transmitter is configured to transmit upstream control plane traffic over a third wavelength rather than the second wavelength. The upstream data plane traffic includes mobile Fronthaul traffic.

These and other embodiments can each optionally include one or more of the following features. Data transmitted to the OLT by the one or more ONUs over the over the second wavelength can be uninterrupted by a quiet period during which ONU discovery or ranging is performed. Transmissions between the ONUs and OLT over the first wavelength and the second wavelength can have a latency and jitter profile that satisfies mobile Fronthaul application requirements.

At least one of the ONUs includes a controller configured to perform operations including directing the upstream control plane traffic to the first upstream optical transmitter during discovery and ranging of the at least one of the ONUs and direct the upstream data plane traffic to the second upstream optical transmitter after discovery and ranging of the at least one of the ONUs has completed. The controller can be configured to perform operations including receiving downstream control plane traffic over the first wavelength; and determining, based on a message in the downstream control plane traffic, that upstream control plane traffic is to be transmitted over the third wavelength rather than the second wavelength; determining, based on timing information included in the downstream control plane traffic, an upstream transmission time interval that has been allocated for transmission of upstream control plane traffic over the third wavelength; and transmitting, using the first upstream optical transmitter, upstream control plane traffic over the third wavelength when the upstream transmission time interval arrives.

The at least one of the ONUs can include a particular ONU having a controller configured to perform operations including transmitting, using the first upstream optical transmitter, an upstream activation message over the third wavelength; receiving, using the downstream optical receiver, downstream control plane traffic over the first wavelength; completing activation of the particular ONU; and transmitting, using the second upstream optical transmitter, upstream data plane traffic over the second wavelength after activation has completed.

The controller can be configured to perform operations including determining, after a pre-specified amount of time, that an acknowledgment of the upstream activation message transmitted over the third wavelength has not been received over the first wavelength; and re-transmitting the upstream activation message over the third wavelength in response to the determination that the acknowledgement has not been received over the first wavelength.

In general, another aspect of the subject matter described in this specification can be embodied in methods that include the operations of during activation of the ONU: transmitting, to an OLT and independent of a quiet period, upstream control plane traffic over a fixed control plane upstream wavelength rather than a fixed data plane upstream wavelength using a control plane transmitter; and receiving downstream control plane traffic from the OLT over a downstream traffic wavelength using a downstream receiver; and after activation of the ONU: transmitting, to the OLT, upstream data plane traffic over the data plane upstream wavelength rather than the control plane wavelength using a data plane transmitter; and receiving downstream data plane traffic over the downstream traffic wavelength using the downstream receiver.

These and other embodiments can each optionally include one or more of the following features. Transmitting the upstream control plane traffic over the control plane upstream wavelength can be performed by the ONU while other ONUs are transmitting upstream data plane traffic over the data plane upstream wavelength.

Upstream data plane traffic can be mobile Fronthaul traffic. A jitter and latency of the upstream data plane traffic in a TDM-PON can meet required jitter and latency levels for mobile Fronthaul standards.

Particular embodiments of the subject matter described in this specification can be implemented so as to realize one or more of the following advantages. Jitter in a TDM-PON can be reduced relative to traditional TDM-PONs by removing the need to utilize a quiet period (also referred to as a quiet window) for new ONU discovery and/or ranging. The latency of communications in a TDM-PON can be reduced relative to traditional TDM-PONs by removing the need to utilize a quiet period for new ONU discovery and/or ranging. The reduced jitter and latency of realized enables the TDM-PON to be used for new applications, such as mobile Fronthaul applications, that require lower jitter and latency than that provided by traditional TDM-PONs that utilize a quiet period for new ONU discovery and/or ranging.

The need for the quite period can be eliminated, for example, by offloading the discovery and ranging process (e.g., the upstream control plane traffic) to a different upstream wavelength than the upstream wavelength that is used to carry upstream data plane traffic, as discussed in detail throughout this document. The separation of the upstream data plane traffic and the control plane traffic to different wavelengths can be achieved without requiring a wavelength agile upstream transmitter. For example, the separation of the upstream data plane traffic and the upstream control plane traffic can be achieved by way of an ONU that utilizes two different fixed wavelength upstream optical transmitters, where one of the transmitters is dedicated to transmitting the data plane traffic upstream, and the other transmitter is dedicated to transmitting the control plane traffic upstream.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
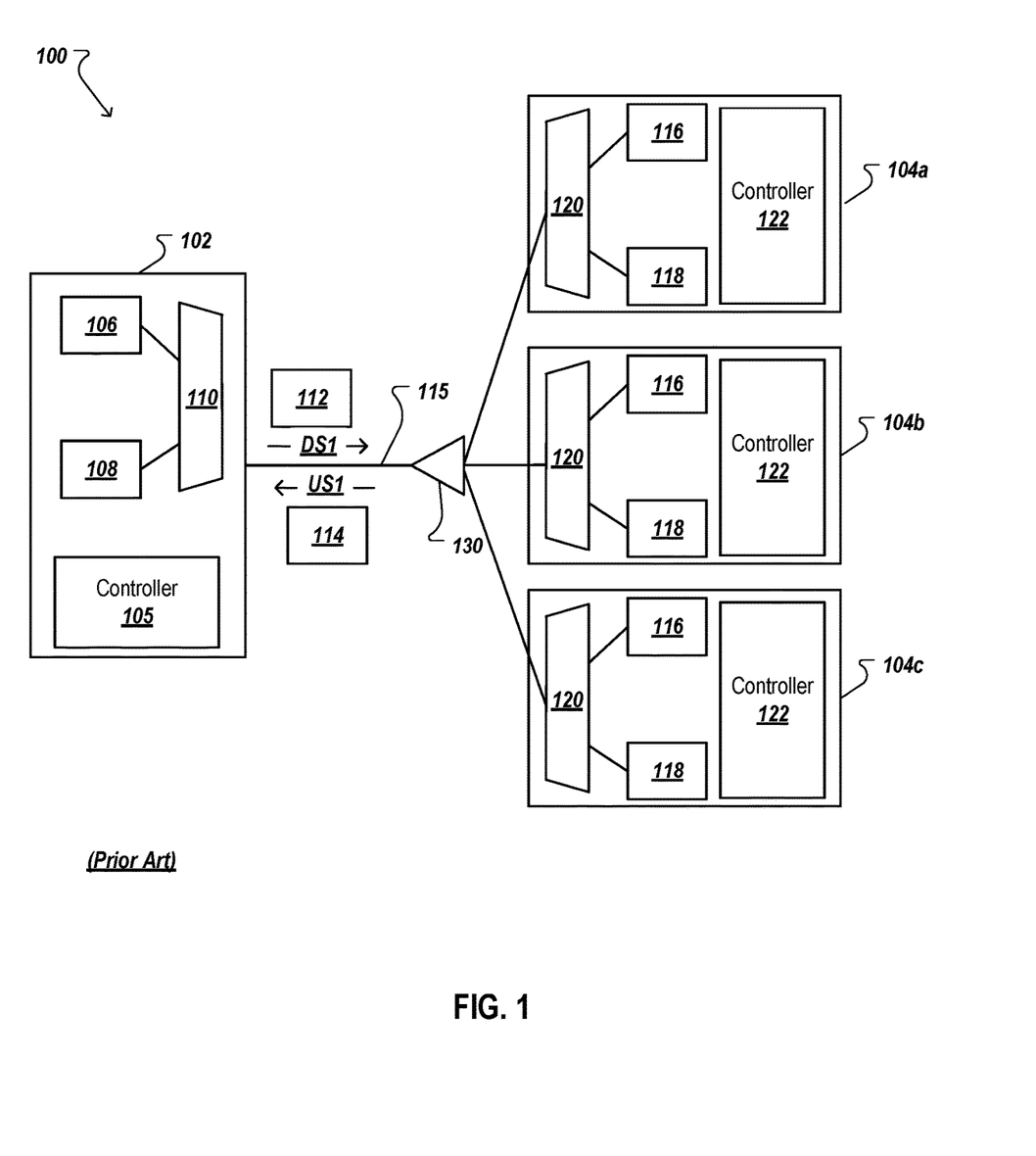
FIG. 1 is a block diagram of a prior art TDM-PON.

FIG. 1 is a block diagram of a prior art TDM-PON 100. The TDM-PON 100 includes an OLT 102 and several ONUs 104a, 104b, and 104c (collectively 104). The OLT 102 includes a controller 105, a downstream transmitter 106, an upstream receiver 108, and a multiplexer/demultiplexer 110. In operation, the OLT 102 transmits downstream traffic 112 to the ONUs 104 using the downstream transmitter 106 and receives upstream traffic 114 from the ONUs 104 using the upstream receiver 108. Generally, the downstream transmitter 106 operates at a fixed downstream wavelength (DS1) on which traffic is transmitted, and the upstream receiver 108 operates at a different fixed upstream wavelength (US1) on which traffic is received. The multiplexer/demultiplexer 110 connects each of the downstream transmitter 106 and upstream receiver 108 to a fiber optic cable 115 (or other optical transmission medium). In operation, the multiplexer/demultiplexer 110 passes downstream traffic 112 to the fiber optic cable 115 on DS1 and passes upstream traffic 114 to the upstream receiver 108 on US1. The controller 105 controls/manages operations performed by the OLT 102.

Meanwhile, each of the ONUs 104 includes an upstream transmitter 116, a downstream receiver 118, and a multiplexer/demultiplexer 120. Generally, the upstream transmitter 116 operates at the fixed upstream wavelength (US1), while the downstream receiver 118 operates at the fixed downstream wavelength (DS1). In operation, each upstream transmitter 116 transmits upstream traffic 114 over US1, while each downstream receiver 118 receives 112 over DS1. Each multiplexer/demultiplexer 120 connects each ONU 104a-c to the fiber optic cable 115 by way of a power splitter/combiner 130. In operation, each multiplexer/demultiplexer 120 passes downstream traffic 112 from the fiber optic cable 115 to the downstream receiver 118, and passes upstream traffic 114 from the 116 to the fiber optic cable 115 by way of the 130. The ONUs 104 can each also include a controller 122 that controls/manages the operations of the ONUs 104. The controllers 105 and controller 122 can each include, for example, an onboard computer, a microprocessor, a multi-core processor, an application-specific instruction set processor, or another appropriate processor.

When an ONU needs to be added to (e.g., communicate over) the TDM-PON 100, the ONU needs to be registered with the OLT 102. Generally, the process by which an ONU is added to the TDM-PON 100 includes ONU discovery and ranging (e.g., as specified by ITU-T G.984.3). After the ONU completes activation through the discovery/ranging process, the OLT 102 dynamically assigns a timeslot to the ONU through a Dynamic Bandwidth Assignment algorithm. Each ONU transmits upstream traffic during its assigned timeslot, so as to avoid collisions in the 100. The communications between the an ONU and the OLT 102 during the discovery/ranging process include control plane traffic that control how the ONU and the OLT 102 communicate over the 100.

Traditionally, the upstream control plane traffic transmitted by an ONU to the OLT 102 would be transmitted over US1 (i.e., the same wavelength as the data upstream data plane traffic), and ONUs are typically discovered and ranged periodically during what is known as a quiet period or quiet window, where no timeslots are assigned to known ONUs and any new ONU wishing to join the PON advertises itself.

Figure 2:
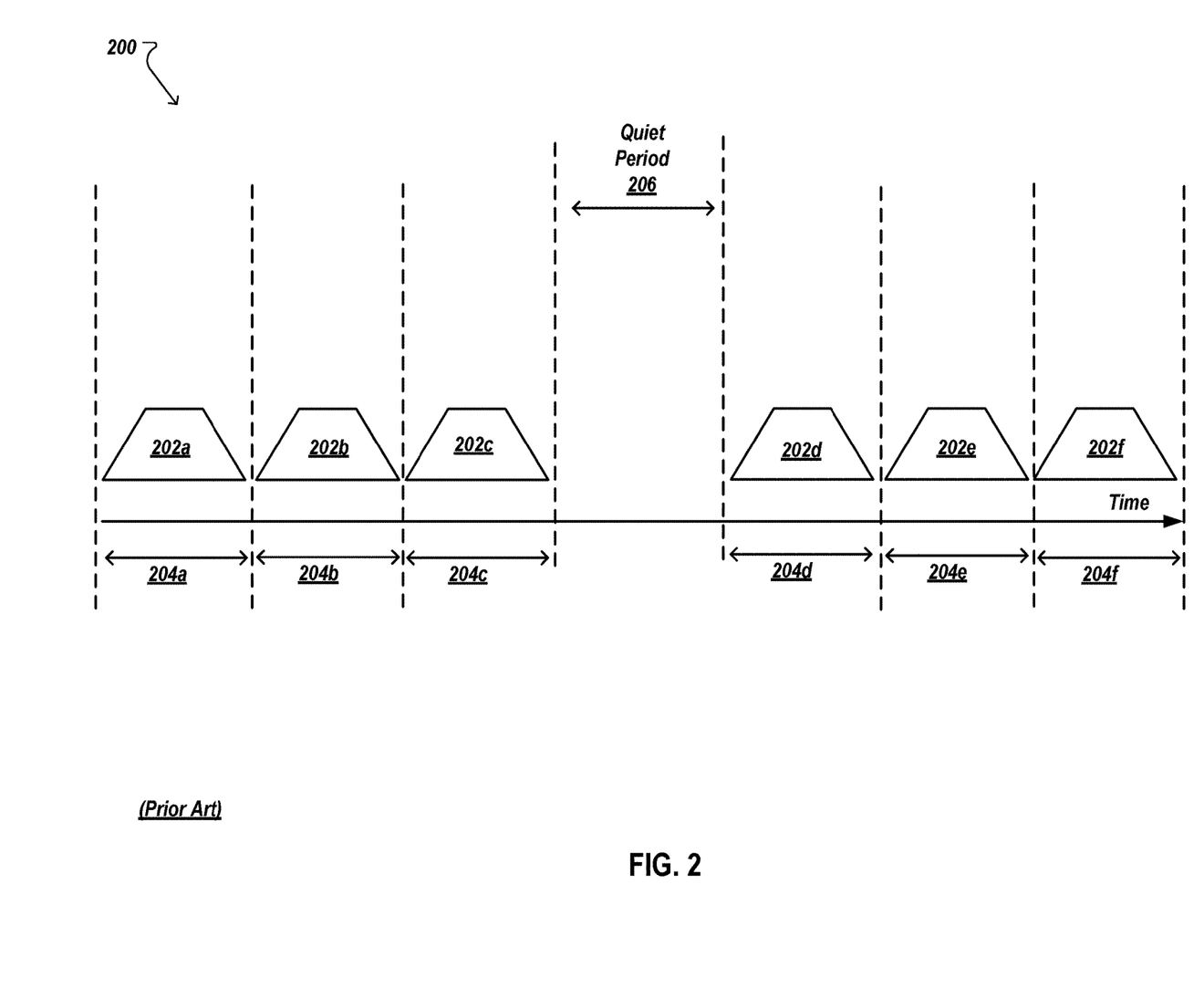
FIG. 2 is an illustration depicting the use of a quiet period for purposes of new ONU discovery and ranging

FIG. 2 is an illustration 200 depicting the use of a quiet period for purposes of new ONU discovery and ranging (e.g., ONU activation). As shown in the illustration 200, ONU upstream traffic 202a-202f (collectively 202) is transmitted during respective timeslots 204a-204f (collectively 204) that have been assigned to the ONUs by the OLT. Periodically, the OLT will instruct all of the known ONUs to stop transmitting upstream traffic to create the quiet period 206 and instruct any unknown ONU that is connected to the PON to announce itself to the OLT. The quiet period 206 is illustrated as having a similar duration as each of the timeslots 204, but in practice, the quiet period 206 can be many times larger than any of the timeslots. As such, any communication that would typically occur during the quiet period 206 would need to be deferred until the end of the quiet period 206, thereby causing jitter and latency.

The use of quiet periods works well unless the payload traffic traversing the PON requires a low latency/low jitter profile. One such application is mobile Fronthaul, where a remote radio head is connected to centralized baseband unit over a fiber. Carrying this traffic over PON requires some form of accommodation for ranging and discovery without "quiet windows" disrupting existing traffic.

Figure 3:
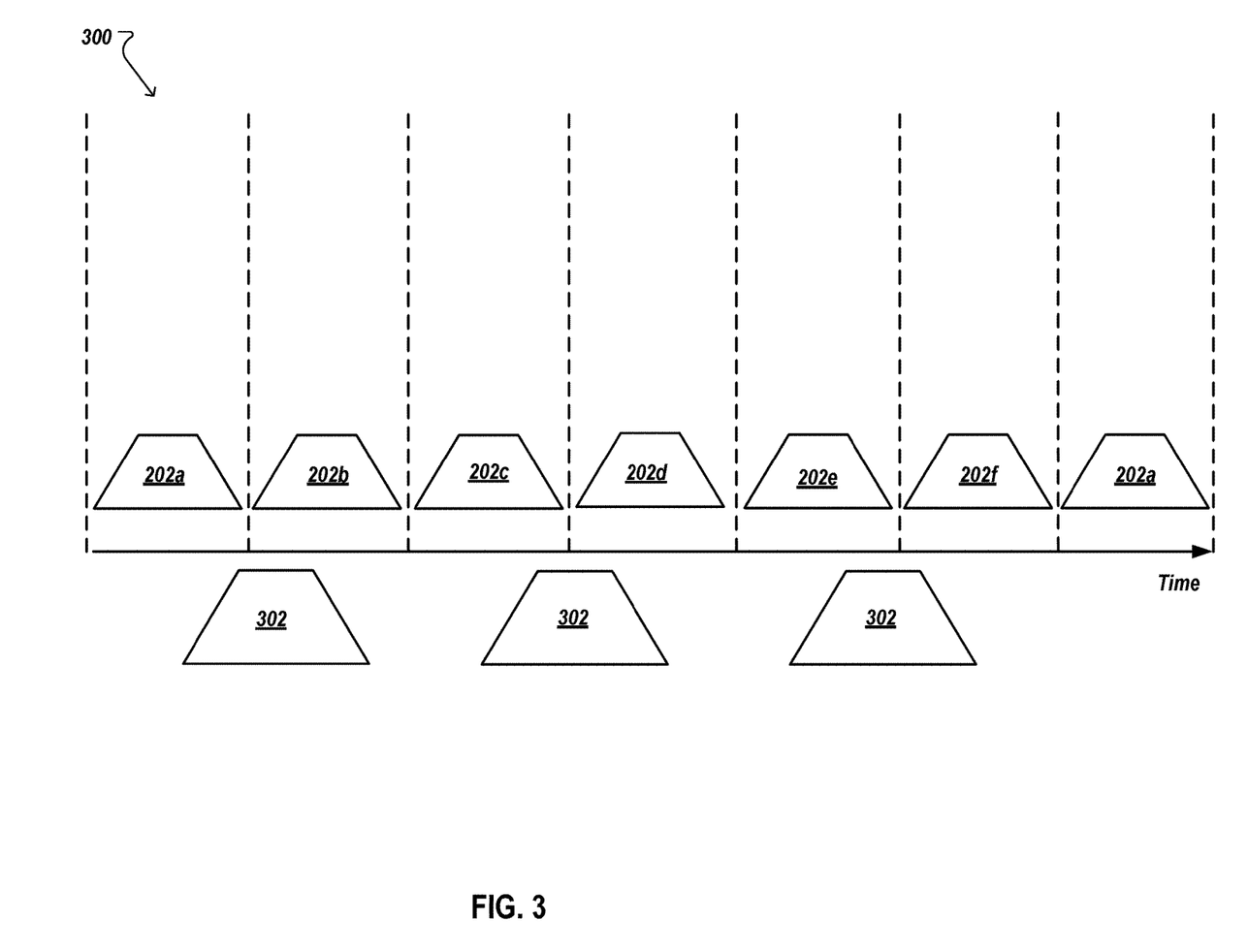
FIG. 3 is an illustration depicting upstream traffic between ONUs and an OLT when the quiet period is eliminated.

The jitter and latency caused by using a quiet period to perform discovery and ranging can be reduced by eliminating the need to use a quiet period, which will enable known ONUs (i.e., ONUs that have completed the discovery and ranging process with the OLT) to continuously communicate with the OLT during the assigned timeslots. FIG. 3 is an illustration 300 depicting upstream traffic between ONUs and an OLT when the quiet period is eliminated. As shown in the illustration, the known ONUs can continuously transmit upstream traffic to the OLT in their assigned timeslots without halting upstream traffic to create the quiet period 206. Thus, the latency and jitter caused by the quiet period is eliminated.

When the quiet period is eliminated, unknown ONUs (i.e., ONUs that have not completed the discovery and ranging with the OLT, or ONUs that need to again complete the discovery and ranging process) will still need to complete the discovery and ranging process, but will be unable to utilize the quiet period for this. One solution is to utilize a second different upstream wavelength to carry the upstream control plane traffic that is transmitted during the discovery and ranging of an unknown ONU. For example, as shown in FIG. 3, an unknown ONU can transmit upstream control plane traffic 302 over the wavelength US2 while the data plane traffic 202a-f of the known ONUs continue to be transmitted to the OLT over the wavelength US1. In some implementations, the ONUs that are deployed in a TDM-PON can be configured to include two different upstream transmitters to facilitate the transmission of upstream control plane traffic 302 by an unknown ONU over US2 while the known ONUs transmit upstream data plane traffic 202a-f over US1. After the unknown ONU completes the discovery and ranging processes, the unknown ONU becomes a known ONU and begins to transmit upstream data plane traffic to the OLT over US1 during its assigned timeslot.

Figure 4:
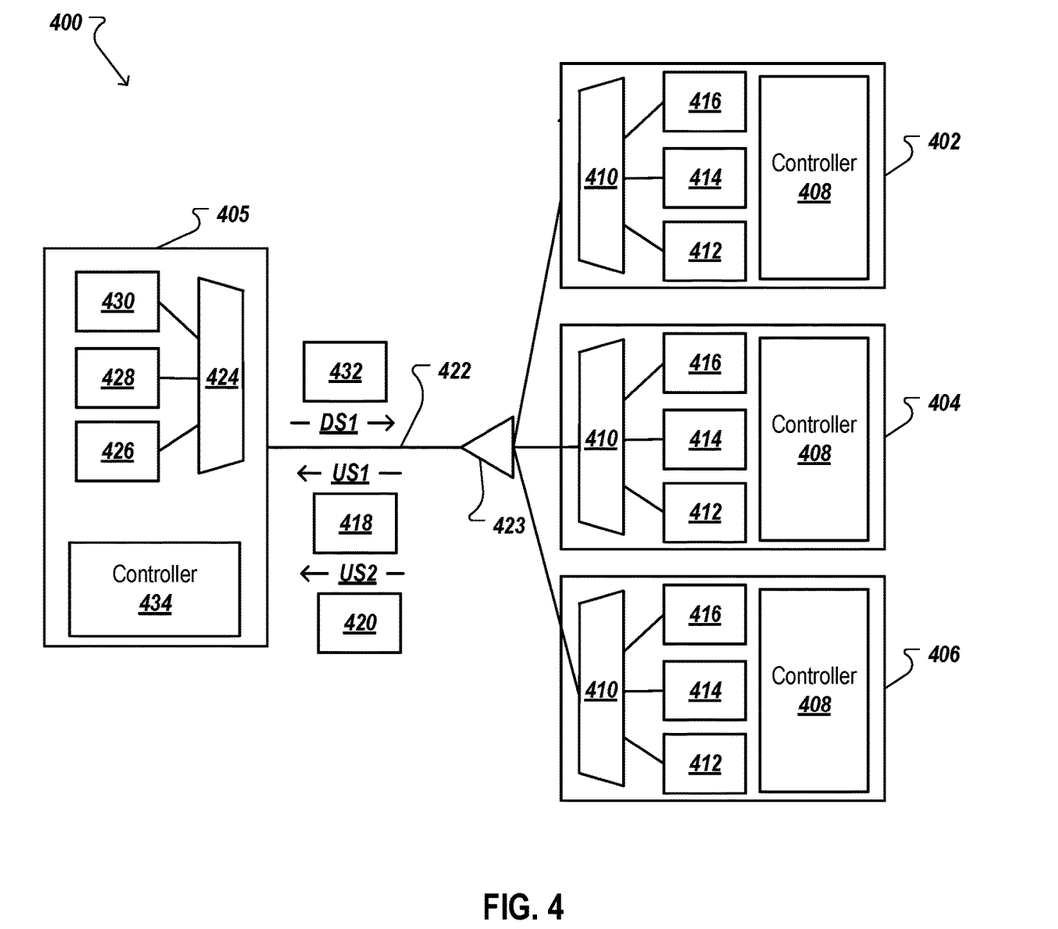
FIG. 4 is a block diagram of an example enhanced TDM-PON.

FIG. 4 is a block diagram of an example enhanced TDM-PON 400. The enhanced TDM-PON 400 includes an OLT 405 and several ONUs 402, 404, and 406. Each of the ONUs includes a controller 408, a multiplexer/demultiplexer 410, a downstream receiver 412 (e.g., optical receiver), and two upstream transmitters 414 and 416 (e.g., optical transmitters). Generally, the downstream receiver 412 operates at a fixed wavelength DS1, and receives downstream traffic transmitted by the OLT 405 on DS1.

In some implementations, the data rates of the two upstream transmitters 414 and 416 can differ. For example, assume that the upstream transmitter 414 is implemented to carry upstream data plane traffic 418, and that the upstream transmitter 416 is implemented to carry upstream control plane traffic 420. In this example, the data rate of the upstream transmitter 414 can be higher (e.g., up to orders of magnitude higher) than the data rate of the upstream transmitter 416. Of course, the upstream transmitter 416 can be implemented to have the same data rate as the upstream transmitter 414.

The two upstream transmitters 414 and 416 are each configured to operate at different wavelengths so as to separate the traffic transmitted by the transmitters 414 and 416. In some implementations, the upstream transmitter 414 can operate at the wavelength US1, and transmit upstream data plane traffic 418 to the OLT 405 over US1. Meanwhile, the upstream transmitter 416 can operate at the wavelength US2, which differs from US1, and transmit upstream control plane traffic to the OLT 405 over US2.

As discussed above, separating the upstream control plane traffic from the upstream data plane traffic allows for the elimination of a quiet period during which the ONUs 402, 404, and 406 are unable to transmit upstream traffic to the OLT 405 for purposes of discovery and ranging unknown ONUs. For example, assume that the ONUs 402 and 404 have already completed the discovery and ranging processes (i.e., the ONUs 402 and 404 are known ONUs), and are transmitting upstream data plane traffic 418 to the OLT 405 over US1 using their respective upstream transmitters 414. Further assume that the ONU 406 has not yet completed the discovery and ranging processes (i.e., the ONU 406 is an unknown ONU). In this example, the ONU 406 can complete the discovery and ranging processes without interrupting the upstream data plane traffic 418 of ONUs 402 and 404 by transmitting control plane traffic 420 required to complete the discovery and ranging processes over US2 using the upstream transmitter 416, as illustrated by FIG. 3. Once the ONU 406 completes the discovery and ranging processes, the ONU 406 will begin transmitting upstream data plane traffic over US1 using its upstream transmitter 414.

The multiplexer/demultiplexer 410 connects the downstream receiver 412, upstream transmitter 414, and upstream transmitter 416 to a fiber optic cable 422 (or another appropriate optical transmission medium) by way of an optical power splitter/combiner 423, and passes the upstream data plane traffic 418 and upstream control plane traffic 420 from the upstream transmitter 414 and upstream transmitter 416, respectively, to the fiber optic cable 422. The fiber optic cable 422 is connected to a multiplexer/demultiplexer 424 of the OLT 405, and the multiplexer/demultiplexer 424 of the OLT 405 is connected to each of an upstream data plane receiver 426, an upstream control plane receiver 428, and a downstream transmitter 430. The multiplexer/demultiplexer 424 passes the upstream data plane traffic 418 received over US1 to the upstream data plane receiver 426, and passes the upstream control plane traffic 420 received over US2 to the upstream control plane receiver 428. In some implementations, each of the upstream data plane receiver 426 and upstream control plane receiver 428 have a fixed wavelength. For example, the upstream data plane receiver 426 can have a fixed operating wavelength of US1, while the upstream control plane receiver 428 can have a fixed operating wavelength of US2. Of course, each of the upstream data plane receiver 426 and the upstream control plane receiver 428 could be wavelength agile receivers that are configured to respectively receive the upstream traffic received over US1 and US2. For downstream communications, the OLT 405 has a downstream transmitter 430 that transmits downstream traffic 432 (e.g., control plane and data plane traffic) to each of the ONU 402, the ONU 404, and the ONU 406. For example, the multiplexer/demultiplexer 424 passes the downstream traffic 432 to the fiber optic cable 422, which carries the downstream traffic 432 to the multiplexer/demultiplexer 410, which passes the downstream traffic 432 to the downstream receiver 412. The OLT 405 includes a controller 434 that controls/manages operations of the OLT 405. The controller 434 can include, for example, an onboard computer, a microprocessor, a multi-core processor, an application-specific instruction set processor, an FPGA, or another appropriate processor.

As mentioned above, each of the ONU 402, the ONU 404, and the ONU 406 include a controller 408 that controls/manages operations of the respective ONU. In some implementations, the controller 408 is configured to direct upstream traffic to one of the upstream transmitter 414 or the upstream transmitter 416 based on a traffic type of the traffic. For example, the controller 408 can determine, based on information included in the traffic (or a source of the traffic), whether the upstream traffic is upstream data plane traffic 418 or upstream control plane traffic 420, and direct (e.g., route) the upstream traffic to one of the upstream transmitter 414 or the upstream transmitter 416 based on the determination. In a specific example, the controller 408 can direct upstream data plane traffic 418 to the upstream transmitter 414 rather than the upstream transmitter 416 and direct upstream control plane traffic 420 to the upstream transmitter 416 rather than the upstream transmitter 414. By directing these different types of traffic to the different transmitters that are operating at different wavelengths, the controller 408 ensures that known ONUs can continue to transmit upstream data plane traffic 418 over US1 while unknown ONUs can transmit upstream control plane traffic 420 over US2. Thus, a quiet period is not needed to complete the discovery and ranging of unknown ONUs, which eliminates the jitter and latency that is caused by the quiet periods. In some situations, the controller 408 directs the upstream control plane traffic 420 to the upstream transmitter 416 during the discovery and ranging process, and then the controller 408 directs the upstream data plane traffic 418 to the upstream transmitter 414 after the discovery and ranging process has completed.

Various techniques can be used to coordinate the transmission of the upstream control plane traffic 420 over US2 to the OLT 405. In some implementations, the transmission of the upstream control plane traffic 420 can be coordinated using a dynamic bandwidth allocation (DBA) technique in which an ONU is informed that upstream control plane traffic 420 is to be transmitted over US2 and the OLT 405 allocates, to that ONU, a specific timeslot for transmitting the upstream control plane traffic 420. For purposes of example, assume that the ONU 402 is an unknown ONU. In this example, the OLT 405 can open quiet windows on US2 during which unknown ONUs can announce its presence to the OLT 405 (e.g., by way of an upstream transmission). When the OLT 405 identifies the ONU 402 as an unknown ONU, the OLT 405 can transmit control plane information (e.g., the DBA information) to the ONU 402 over DS1 using the downstream transmitter 430. The ONU 402 will receive the control plane information using the downstream receiver 412, and process the control information. When the control information (which can be/include PLOAM messages) specifies that the ONU 402 is to transmit upstream control plane traffic 420 over US2 rather than US1, the ONU 402 can configure itself to transmit the upstream control plane traffic 420 over DS2 using the 416. Furthermore, when the control information includes timing information specifying the timeslot (or other timing information) that the OLT 405 has allocated to the ONU 402, the ONU 402 can transmit the upstream control plane traffic 420 during the allocated timeslot.

In some implementations, US2 can be operated without the typical master/slave configuration, e.g. the control information may not include timing information. In these situations, the ONU 402 can implement a transmission technique that accounts for the fact that collisions may occur on US2. For example, when the ONU 402 is not provided timing information for the upstream control plane traffic 420, it is possible that the upstream control plane traffic 420 transmitted by the ONU 402 will arrive at the OLT 405 at the same time as upstream control plane traffic 420 transmitted by another ONU. When collision occurs, the OLT 405 will not transmit an acknowledgement to any of the ONUs having communications that were involved in the collision. Thus, when the ONU 402 (or any other ONU) fails to receive an acknowledgement to the upstream control plane traffic 420 sent over US2, the ONU 402 can again attempt to send the upstream control plane traffic 420 at another time. In some implementations, the second and/or any subsequent attempts to transmit the upstream control plane traffic 420 to the OLT 405 over US2 can be performed using a random backoff technique to vary the time at which it transmits the upstream control plane traffic 420 to the OLT 405, thereby reducing the likelihood of further collisions.

In some situations, unknown ONUs can be configured to automatically announce their presence to the OLT 405 over US2 when the unknown ONUs are powered on, or otherwise brought online. For example, assume that the ONU 402 is being brought online for the first time. In this example, the ONU 402 can be configured to automatically transmit the upstream control plane traffic 420 over US2. In this situation, the ONU 402 again is not using any timing information provided by the OLT 405 to prevent collisions with transmissions by other ONUs over US2, so there is the potential for data collisions on US2. As such, the ONU 402 can utilize the random backoff discussed above (or another technique) to vary the second and/or subsequent attempts to transmit the upstream control plane traffic 420 over US2 when an acknowledgement to the upstream control plane traffic 420 is not received by the ONU 402.

When the ONU 402 receives an acknowledgement of the upstream control plane traffic 420 from the OLT 405, the ONU 402 can continue to complete the activation process (e.g., discovery and ranging processes) according to appropriate standards by communicating any necessary upstream control plane traffic over US2, and receiving control plane traffic from the OLT 405 on DS1. Once the activation process is complete, the OLT 405 can transmit upstream data plane traffic over US1.

Figure 5:
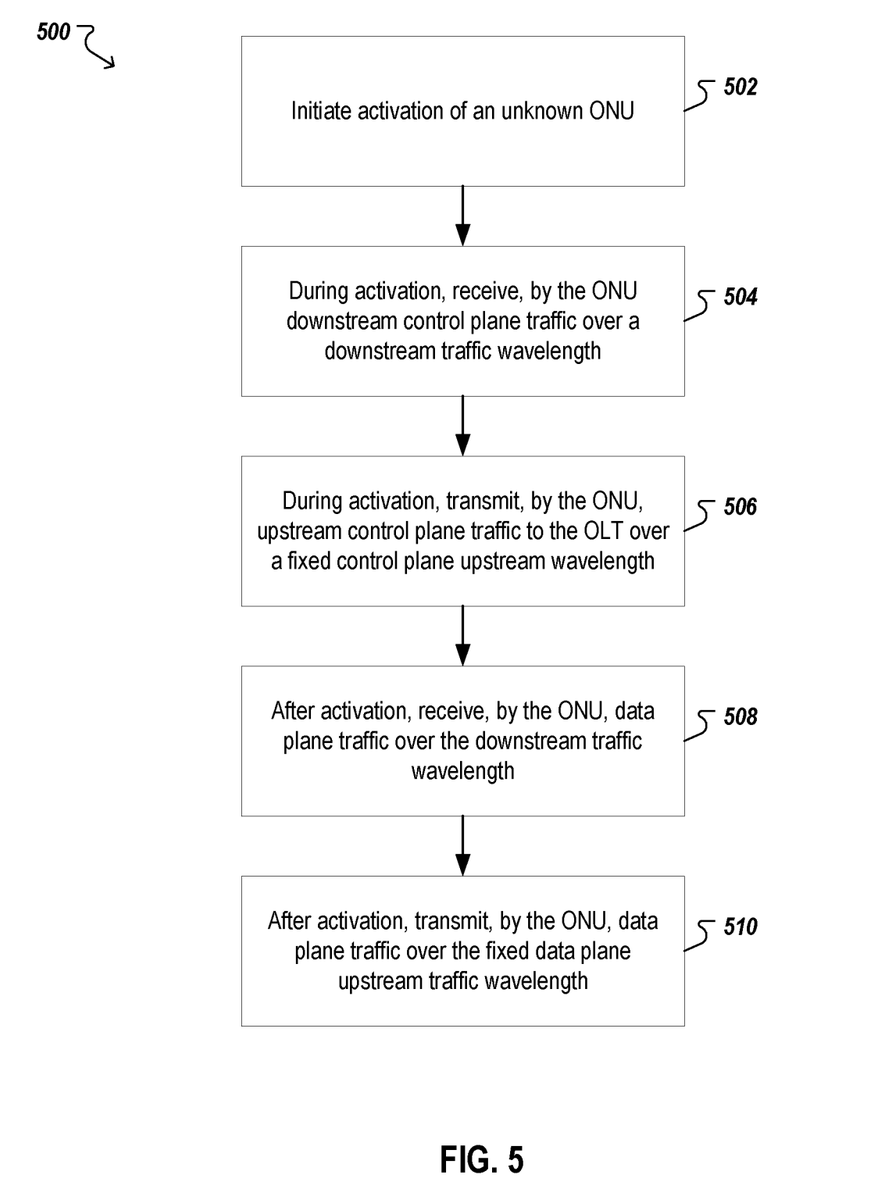
FIG. 5 is a flow chart of an example process for directing traffic over a TDM-PON.

FIG. 5 is a flow chart of an example process 500 for communicating over a TDM-PON. The process 500 includes the discovery of unknown ONUs without using a quiet period on US1. The process 500 can be implemented by telecommunications devices that include a controller another data processing apparatus. The process 500 can also be implemented as instructions that cause one or more data processing apparatus the process 500 when the instructions are executed by the one or more data processing apparatus.

Activation of an unknown ONU is initiated (502). Initiation of the activation can be performed by the ONU or the OLT. As discussed above, the ONU can be configured to initiate the activation when it is powered on, or initiation of the activation can occur based on a downstream message that invites unknown ONUs to announce their presence.

To facilitate activation of an ONU without requiring a quiet period on the wavelength carrying data plane traffic, the message transmitted by the OLT can specify that ONUs should utilize a dedicated upstream wavelength (e.g., separate from a wavelength on which upstream data plane traffic is carried) to complete the activation process (e.g., discovery and ranging), thereby eliminating the need for a quiet period on the wavelength that is carrying upstream data plane traffic. As discussed above, the use of a quiet period in a PON causes latency and jitter that limits the ability of the PON to be used for low latency and/or low jitter applications, such as mobile Fronthaul applications. When activation of ONUs in the PON can be performed without the use of the quiet period, the latency and jitter caused by the quiet period is no longer an issue, thereby allowing the PON to be used for these low jitter and/or low latency applications.

During activation of the ONU, the ONU receives downstream control plane traffic from the OLT (504). The downstream control plane traffic can be received over a downstream traffic wavelength (e.g., DS1) using a downstream receiver (e.g., downstream receiver 412). In some implementations, the downstream wavelength used to receive the downstream control plane traffic can be the same wavelength over which the OLT transmits downstream data plane traffic to the ONU. The downstream control plane traffic can include acknowledgements of the upstream control plane traffic transmitted by the ONU.

During activation of the ONU, the ONU transmits upstream control plane traffic to the OLT (506). In some implementations, the upstream control plane traffic is transmitted over a fixed control plane upstream wavelength rather than transmitting the upstream control plane traffic over a fixed data plane upstream wavelength. For example, as discussed above US2 can be used to transmit the upstream control plane traffic, while US1 is used to transmit the upstream data plane traffic to the OLT. The upstream control plane traffic can be transmitted using a control plane transmitter of the ONU (e.g., 416 of FIG. 4). The ONU can transmit the upstream control plane traffic over the control plane upstream wavelength while other ONUs are transmitting upstream data plane traffic over the data plane upstream wavelength, which eliminates the need for a quiet period on the data plane upstream wavelength. As such, the upstream data plane traffic can include mobile Fronthaul traffic because a jitter and latency profile of the upstream data plane traffic meets required jitter and latency levels for mobile Fronthaul standards.

In some implementations, the ONU includes a controller that directs traffic to the appropriate upstream transmitter. For example, when the ONU is configured to automatically transmit an upstream activation message that initiates activation of the ONU, the controller can be programmed to direct that initial activation message (and any subsequent control plane traffic) over the fixed data plane upstream wavelength (e.g., US2 discussed above). When the OLT initiates the activation of the ONU (e.g., by way of an invitation to unknown ONUs), the controller can determine that the OLT has instructed unknown ONUs to transmit upstream control plane traffic (e.g., traffic used to complete discovery and ranging of the ONU) over the fixed control plane upstream wavelength rather than over the fixed data plane upstream wavelength. In other instances where a legacy OLT does not have a separate control plane receiver, the controller can send the control plane traffic of the traditional US1 data plane wavelength. This preserves backwards compatibility, though latency and jitter sensitive applications would not be supported until the OLT is upgraded.

During activation, the ONU can either utilize a timeslot that is assigned to the ONU for upstream control plane traffic, or the ONU can freely transmit the upstream control plane traffic over a dedicated upstream control channel (e.g., the fixed control plane upstream wavelength). As discussed above, when the ONU freely transmits the upstream control plane traffic (e.g., without any assigned timeslot), the ONU may experience collisions with upstream control plane traffic from other ONUs. Therefore, as discussed above, the ONU can implement a randomized backoff process to retry upstream control plane traffic transmissions when the ONU does not receive an acknowledgement from the OLT. For example, the ONU (e.g., the controller of the ONU) can determine, after a pre-specified amount of time, that an acknowledgment of the upstream control plane traffic (e.g., the activation message) has not been received. In response to this determination, the ONU can re-transmit the upstream control plane traffic in response to the determination that the acknowledgement has not been received.

After activation of the ONU, the ONU receives downstream data plane traffic over the downstream traffic wavelength (508). The downstream data plane traffic can be received using the downstream receiver (e.g., downstream receiver 412).

After activation of the ONU, the ONU transmits upstream data plane traffic over the fixed data plane upstream wavelength (510). In some implementation, the ONU transmits the upstream data plane traffic over the fixed data plane upstream wavelength rather than the control plane upstream wavelength. The upstream data plane traffic can be transmitted over the fixed data plane upstream wavelength using a data plane transmitter (e.g., upstream transmitter 414). Note that the ONU can continue to transmit any upstream control plane traffic over the fixed data plane upstream wavelength after activation. In some situations, after activation, the ONU can transmit upstream control plane traffic over the fixed data plane upstream wavelength during the timeslot allocated to the ONU by the OLT.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An optical network unit comprising:
a downstream optical receiver configured to receive downstream traffic over a first downstream wavelength;
a first upstream optical transmitter having a first data rate;
a second upstream optical transmitter having a second data rate; and
a controller configured to direct upstream traffic to the first upstream optical transmitter or the second upstream optical transmitter depending on a traffic type of the traffic, wherein traffic having a control plane traffic type is directed to the first upstream optical transmitter and traffic having a data plane traffic type is directed to the second upstream optical transmitter, wherein the controller is configured to direct the control plane traffic to the first upstream optical transmitter during discovery and ranging of the ONU and direct the upstream data plane traffic to the second upstream optical transmitter after discovery and ranging of the ONU has completed.

2. The optical network unit of claim 1, wherein the controller is further configured to perform operations comprising:
receiving downstream control plane traffic over the first wavelength; and
determining, based on a message in the downstream control plane traffic, that upstream control plane traffic is to be transmitted by the first upstream optical transmitter over a first upstream wavelength rather than a second upstream wavelength.

3. The optical network unit of claim 2, wherein the controller is further configured to perform operations comprising:
determining, based on timing information included in the downstream control plane traffic, an upstream transmission time interval that has been allocated to the optical network unit for transmission of upstream control plane traffic over the first upstream wavelength; and
transmitting, using the first upstream optical transmitter, upstream control plane traffic over the first upstream wavelength when the upstream transmission time interval that has been allocated to the optical network unit arrives.

4. The optical network unit of claim 1, wherein:
the first upstream optical transmitter has a fixed optical wavelength at the first upstream wavelength; and
the second upstream optical transmitter has a fixed optical wavelength at the second upstream wavelength.

5. An optical network unit comprising:
a downstream optical receiver configured to receive downstream traffic over a first downstream wavelength;
a first upstream optical transmitter having a first data rate;
a second upstream optical transmitter having a second data rate; and
a controller configured to direct upstream traffic to the first upstream optical transmitter or the second upstream optical transmitter depending on a traffic type of the traffic, wherein traffic having a control plane traffic type is directed to the first upstream optical transmitter and traffic having a data plane traffic type is directed to the second upstream optical transmitter, wherein the controller is configured to perform operations further comprising:
transmitting, using the first upstream optical transmitter, an upstream activation message over the first upstream wavelength;
receiving, using the downstream optical receiver, downstream control plane traffic over the first downstream wavelength;
completing activation of the optical network unit; and
transmitting, using the second upstream optical transmitter, upstream data plane traffic over a second upstream wavelength after activation has completed.

6. The optical network unit of claim 5, wherein the controller is configured to perform operations comprising:
determining, after a pre-specified amount of time, that an acknowledgment of the upstream activation message transmitted over the first upstream wavelength has not been received over the first wavelength; and
re-transmitting the upstream activation message over the first upstream wavelength in response to the determination that the acknowledgement has not been received over the first wavelength.

7. An optical network unit comprising:
a downstream optical receiver configured to receive downstream traffic over a first downstream wavelength;
a first upstream optical transmitter having a first data rate;
a second upstream optical transmitter having a second data rate; and
a controller configured to direct upstream traffic to the first upstream optical transmitter or the second upstream optical transmitter depending on a traffic type of the traffic, wherein traffic having a control plane traffic type is directed to the first upstream optical transmitter and traffic having a data plane traffic type is directed to the second upstream optical transmitter, wherein transmission of the upstream control plane traffic over a different wavelength than the upstream data plane traffic eliminates the need for a quiet period during which upstream data plane traffic of known ONUs is halted for an activation process that discovers and ranges unknown ONUs.

8. The optical network unit of claim 7, wherein elimination of the quiet period reduces latency and jitter for data traffic flowing across a TDM-based PON in which the optical network unit is deployed.

9. An optical network unit comprising:
a downstream optical receiver configured to receive downstream traffic over a first downstream wavelength;
a first upstream optical transmitter having a first data rate;
a second upstream optical transmitter having a second data rate; and
a controller configured to direct upstream traffic to the first upstream optical transmitter or the second upstream optical transmitter depending on a traffic type of the traffic, wherein traffic having a control plane traffic type is directed to the first upstream optical transmitter and traffic having a data plane traffic type is directed to the second upstream optical transmitter, wherein transmission of the upstream control plane traffic over a different wavelength than the upstream data plane traffic in a PON provides an upstream latency and jitter profile that satisfies mobile Fronthaul application requirements.

10. A system comprising:
an OLT; and
one or more ONUs that are communicatively coupled to the OLT by a PON, wherein at least one of the ONUs comprises:
 a downstream optical receiver;
 a first upstream optical transmitter having a first data rate; and
 a second upstream optical transmitter having a second data rate; wherein:
  the optical receiver is configured to receive downstream data plane traffic over a first wavelength;
  the second upstream optical transmitter is configured to transmit upstream data plane traffic over a second wavelength; and
  the first upstream optical transmitter is configured to transmit upstream control plane traffic over a first upstream wavelength rather than a second upstream wavelength, wherein the upstream data plane traffic comprises mobile Fronthaul traffic, and
wherein data transmitted to the OLT by the one or more ONUs over the second upstream wavelength is uninterrupted by a quiet period during which ONU discovery or ranging is performed.

11. A system comprising:
an OLT; and
one or more ONUs that are communicatively coupled to the OLT by a PON, wherein at least one of the ONUs comprises:
 a downstream optical receiver;
 a first upstream optical transmitter having a first data rate; and
 a second upstream optical transmitter having a second data rate; wherein:
  the optical receiver is configured to receive downstream data plane traffic over a first wavelength;
  the second upstream optical transmitter is configured to transmit upstream data plane traffic over a second wavelength; and
  the first upstream optical transmitter is configured to transmit upstream control plane traffic over a first upstream wavelength rather than a second upstream wavelength, wherein the upstream data plane traffic comprises mobile Fronthaul traffic, wherein transmissions between the ONUs and OLT over the first upstream wavelength and the second upstream wavelength have a latency and jitter profile that satisfies mobile Fronthaul application requirements.

12. A system comprising:
an OLT; and
one or more ONUs that are communicatively coupled to the OLT by a PON, wherein at least one of the ONUs comprises:
 a downstream optical receiver;
 a first upstream optical transmitter having a first data rate; and
 a second upstream optical transmitter having a second data rate; wherein:
  the optical receiver is configured to receive downstream data plane traffic over a first wavelength;
  the second upstream optical transmitter is configured to transmit upstream data plane traffic over a second wavelength; and
  the first upstream optical transmitter is configured to transmit upstream control plane traffic over a first upstream wavelength rather than a second upstream wavelength, wherein the upstream data plane traffic comprises mobile Fronthaul traffic, wherein the at least one of the ONUs further comprises a controller configured to perform operations including directing the upstream control plane traffic to the first upstream optical transmitter during discovery and ranging of the at least one of the ONUs and direct the upstream data plane traffic to the second upstream optical transmitter after discovery and ranging of the at least one of the ONUs has completed.

13. The system of claim 12, wherein the controller is further configured to perform operations comprising:
 receiving downstream control plane traffic over the first downstream wavelength; and
 determining, based on a message in the downstream control plane traffic, that upstream control plane traffic is to be transmitted over the first upstream wavelength rather than the second upstream wavelength;
 determining, based on timing information included in the downstream control plane traffic, an upstream transmission time interval that has been allocated for transmission of upstream control plane traffic over the first upstream wavelength; and
 transmitting, using the first upstream optical transmitter, upstream control plane traffic over the first upstream wavelength when the upstream transmission time interval arrives.

14. A system comprising:
an OLT; and
one or more ONUs that are communicatively coupled to the OLT by a PON, wherein at least one of the ONUs comprises:
 a downstream optical receiver;
 a first upstream optical transmitter having a first data rate; and
 a second upstream optical transmitter having a second data rate; wherein:
  the optical receiver is configured to receive downstream data plane traffic over a first wavelength;
  the second upstream optical transmitter is configured to transmit upstream data plane traffic over a second wavelength; and
  the first upstream optical transmitter is configured to transmit upstream control plane traffic over a first upstream wavelength rather than a second upstream wavelength, wherein the upstream data plane traffic comprises mobile Fronthaul traffic, wherein the at least one of the ONUs further comprises a particular ONU having a controller configured to perform operations including:
   transmitting, using the first upstream optical transmitter, an upstream activation message over the first upstream wavelength;
   receiving, using the downstream optical receiver, downstream control plane traffic over the first downstream wavelength;
   completing activation of the particular ONU; and
   transmitting, using the second upstream optical transmitter, upstream data plane traffic over the second upstream wavelength after activation has completed.

15. The optical network unit of claim 14, wherein the controller is configured to perform operations comprising:
determining, after a pre-specified amount of time, that an acknowledgment of the upstream activation message transmitted over the first upstream wavelength has not been received over the first wavelength; and
re-transmitting the upstream activation message over the first upstream wavelength in response to the determination that the acknowledgement has not been received over the first wavelength.

16. A method performed by an ONU, comprising:
during activation of the ONU:
receiving downstream control plane traffic from the OLT over a downstream traffic wavelength using a downstream receiver; and
transmitting, to an OLT and independent of a quiet period, upstream control plane traffic over a fixed control plane upstream wavelength rather than a fixed data plane upstream wavelength using a control plane transmitter;

after activation of the ONU:
receiving downstream data plane traffic over the downstream traffic wavelength using the downstream receiver; and
transmitting, to the OLT, upstream data plane traffic over the data plane upstream wavelength rather than the control plane wavelength using a data plane transmitter, wherein a jitter and latency of the upstream data plane traffic in a TDM-PON meets required jitter and latency levels for mobile Fronthaul standards.

17. The method of claim 16, wherein transmitting the upstream control plane traffic over the control plane upstream wavelength is performed by the ONU while other ONUs are transmitting upstream data plane traffic over the data plane upstream wavelength.

18. The method of claim 16, wherein upstream data plane traffic comprises mobile Fronthaul traffic.

* * * * *

UNITED STATES PATENT AND TRADEMARK OFFICE
CERTIFICATE OF CORRECTION

PATENT NO. : 10,547,407 B2  
APPLICATION NO. : 16/159285  
DATED : January 28, 2020  
INVENTOR(S) : Jared Cress Page 1 of 1

It is certified that error appears in the above-identified patent and that said Letters Patent is hereby corrected as shown below:

In the Claims

In Column 17, Line 1, Claim 15, please delete "optical network unit" and insert -- system --

Signed and Sealed this  
Fifth Day of May, 2020

Andrei Iancu  
*Director of the United States Patent and Trademark Office*